United States Patent [19]

Kaneda et al.

[11] Patent Number: 5,717,676
[45] Date of Patent: Feb. 10, 1998

[54] APPARATUS FOR RECORDING ON MASTER OPTICAL DISC

[75] Inventors: Yushi Kaneda; Hisayuki Yamatsu, both of Tokyo, Japan

[73] Assignee: Sony Corporation, Japan

[21] Appl. No.: 593,509

[22] Filed: Jan. 30, 1996

[30] Foreign Application Priority Data

Jan. 31, 1995 [JP] Japan ................................ 7-014690

[51] Int. Cl.⁶ ............................................. G11B 7/00
[52] U.S. Cl. ................... 369/116; 369/100; 369/121; 369/44.38
[58] Field of Search ................... 369/116, 97, 121, 369/100, 109, 44.37, 44.38

[56] References Cited

U.S. PATENT DOCUMENTS

| | | | |
|---|---|---|---|
| 5,043,965 | 8/1991 | Iida et al. | 369/116 |
| 5,084,856 | 1/1992 | Henmi et al. | 369/116 |
| 5,305,298 | 4/1994 | Yokota | 369/116 |
| 5,461,602 | 10/1995 | Moriya et al. | 369/116 |
| 5,479,392 | 12/1995 | Holtslag et al. | 369/116 |

*Primary Examiner*—Loha Ben
*Attorney, Agent, or Firm*—Ronald P. Kananen

[57] ABSTRACT

A master optical disc recording apparatus in need of only little maintenance and allowing easy optical axis adjustment despite its simplified construction. The master optical disc recording apparatus outputs an outgoing light having a converted wavelength ranging from 0.3 to 0.36 μm by a non-linear optical process of a non-linear optical element enclosed within a laser light generating portion 1. The outgoing light is modulated by a light modulator 3 in accordance with recording information from outside to produce an exposing light which is converged by a recording lens 4 on the master optical disc 7 coated with a photosensitive material. The master optical disc 7, kept in rotation, is scanned with light from the recording lens 4 for writing the recording information. The recording lens 4 includes an automatic focusing mechanism including a bi-acid actuator 5 for servo adjustment.

10 Claims, 6 Drawing Sheets

APPARATUS FOR RECORDING ON MASTER OPTICAL DISC

BACKGROUND OF THE INVENTION

This invention relates to a recording apparatus fop a master optical disc in which the light beam converted from an output of a light source by a non-linear optical process may be advantageously employed as an illuminating light fop light exposure of a master optical disc.

An optical recording medium is employed fop recording/reproduction of data such as video or audio signals. Although a large quantity of data may be recorded on an optical recording medium, it is desirable fop an optical recording medium to have a recording capacity much larger than the current recording capacity.

For realizing an optical recording medium of a larger recording capacity, it is required to raise the information recording density of the information recording medium. One of the techniques of increasing the recording density is to reduce the wavelength of the laser beam employed fop high density recording.

Recently, a demand has been raised for a laser beam of the ultraviolet wavelength as a short wavelength laser beam. In particular, the laser beam of the ultraviolet wavelength in the vicinity for the wavelength of 355 nm is desired most strongly. For generating the laser light of this wavelength range, there is known a method of generating third harmonics of the infrared wavelength used as the fundamental wavelength.

If, for generating the third harmonics (THG) by a laser beam radiating device, Nd:YAG or Nd:YVO$_4$, a solid laser is employed as a laser medium, the laser beam of the fundamental wave generated by exciting the laser medium by a light pumping method and the second harmonics produced on wavelength conversion of the fundamental laser beam are frequency-mixed for generating the third harmonics of the fundamental laser beam, that is, the laser light in the vicinity of the wavelength of 355 nm within the UV range.

The laser beam in the vicinity of the wavelength of 355 nm is a laser beam generated with the pulse mode. The reason the THG incurs the mode of pulse oscillation is that, when the outgoing laser beam of the fundamental wavelength is frequency-mixed with the second harmonics, the laser beam of the third harmonics is generated by a single pass in which the laser beam is passed only once through a non-linear crystal. The result is that the non-linear conversion of third harmonics is limited to only one pass resulting in pulsed oscillation of the laser beam of third harmonics.

Since the laser beam radiated in the vicinity of the wavelength of 355 nm is a pulsed light beam, such laser beam is difficult to apply to master optical disc recording where continuous light beam is necessitated.

Up to now, a gas laser, such as He-Cd laser or Ar laser, has predominantly been employed for recording on a master optical disc. The gas laser, however, is bulky in size. In addition, it is low in durability and light beam emission efficiency and is in need of frequent maintenance operations.

In addition, with such gas laser, the laser light source of the master optical disc recording apparatus outputs only the pure ultraviolet light, such that the output light beam cannot be recognized visually. Thus, for adjusting the optical axis of the master optical disc recording apparatus with the use of, for example, an Ar laser, a laser of another visible light beam is used and, as the visible laser beam is allowed to be transmitted by a dichroic mirror, the optical axis of the visible laser beam coincides with that of the Ar laser, for adjusting the optical axis of the entire system or detecting focusing errors on the recording master disc in order to effect positive information recording.

OBJECT AND SUMMARY OF THE INVENTION

It is an object of the present invention to provide a recording apparatus for a master optical disc whereby optical axis adjustment may be achieved easily by a simplified arrangement with only little maintenance.

According to the present invention, there is provided an apparatus for exposing a master optical disc having laser beam generating means for generating a light beam having a wavelength of 300 to 360 nm by wavelength conversion from a light beam from a laser light source by a resonator having a non-linear optical crystal element therein, light modulation means for modulating an outgoing light beam from the laser light generating means in accordance with the recording information from outside, and scanning means for scanning the master optical disc with the light beam from the light modulation means for recording the recording information thereon.

The master optical disc recording apparatus is small-sized as compared to an arrangement employing the conventional gas laser as a light source. The generated light beam from the external resonator is transmitted through a beam shaping optical element for radiating a spatially symmetrical light beam for avoiding direction dependency of spatial resolution.

By employing the stray light beam of the visible range radiated on the same optical axis as that of the illuminating light beam simultaneously with the illuminating light for optical axis adjustment and focusing detection on the master optical disc, the apparatus may be simplified in construction without the necessity of providing the apparatus with a laser light in a visible range.

By employing a material sensitized with the wavelength of the stray light for the photoresist, optical axis adjustment and focusing detection on the master optical disc may be achieved with visual check for producing a high-quality master disc.

DESCRIPTION OF THE PREFERRED EMBODIMENTS

Figure 1:
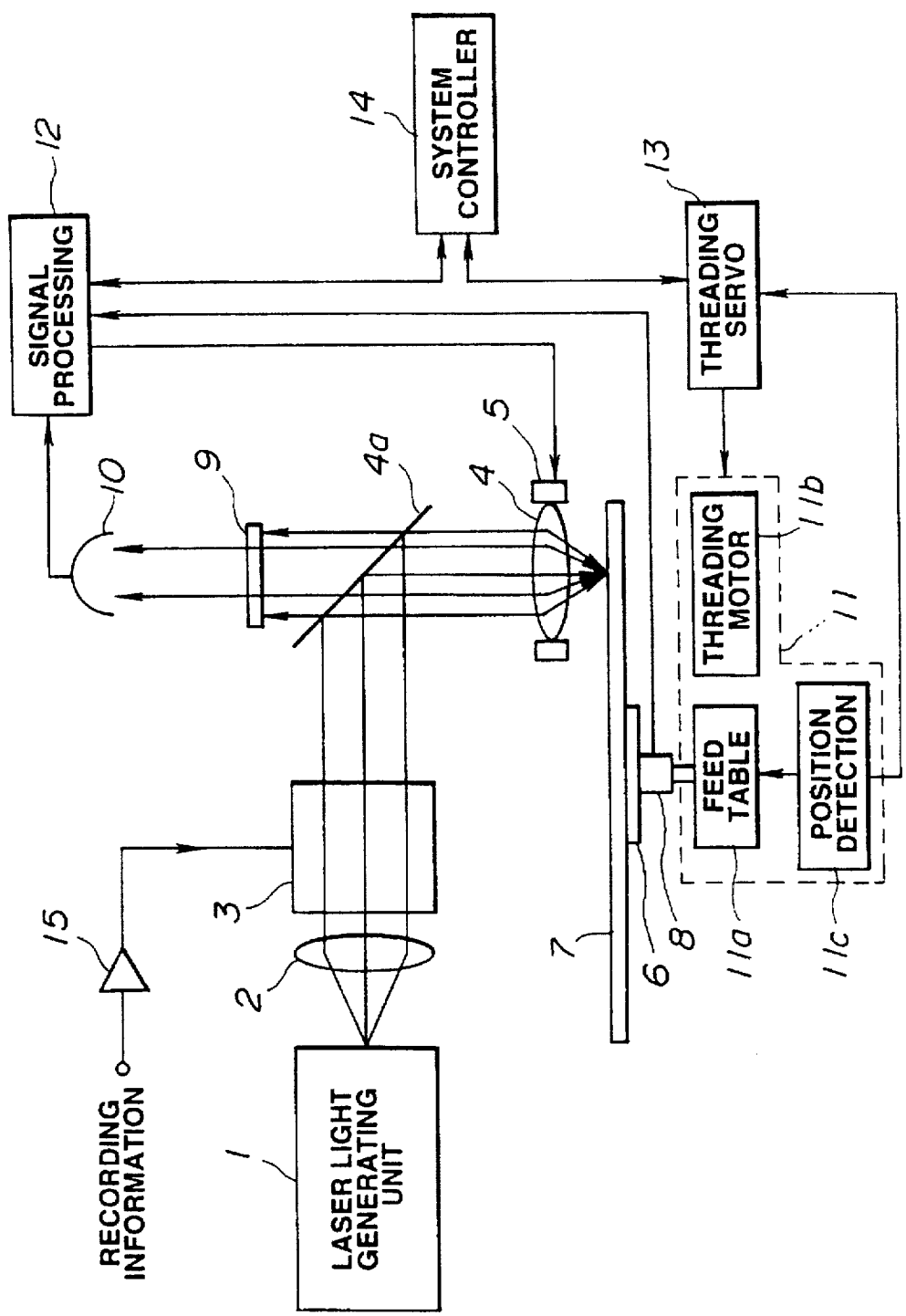
FIG. 1 schematically illustrates a master optical disc recording apparatus according to the present invention.

Referring to the drawings, preferred embodiments of a master optical disc recording apparatus according to the present invention will be explained in detail.

FIG. 1 shows an arrangement of a master optical disc recording apparatus embodying the present invention.

The master optical disc recording apparatus includes a laser beam emitting portion 1 for outputting a laser beam with a wavelength of 0.3 to 0.36 μm to a master optical disc, and a light modulating portion 3 for modulating the outgoing light beam from the laser beam emitting portion 1 in accordance with the recording information from outside. The master optical disc recording apparatus also includes a recording lens 4 for condensing the light beam from the light modulating unit 3 to near the limit of the light wavelength after bending by 90° by a half mirror 4a with respect to the optical axis of the light beam from the light modulating unit, and a bi-axial actuator 5 for driving the recording lens 4 in accordance with various servo signals. The master optical disc recording apparatus also includes a master optical disc 7 coated with a photoresist, placed on a turntable 6 for receiving the light beam from the recording disc 4, and a spindle motor 8 for running the turntable in rotation. The master optical disc recording apparatus also includes a filter 9 for cutting the ultraviolet light component contained in the reflected light sent from the master optical disc 7 and transmitted through the recording lens 4 and the half-mirror 4a, and a photodetector 10 for receiving the light transmitted through the filter 9. The master optical disc recording apparatus further includes a threading mechanism 11 for sliding the turntable 6 as the turntable is kept in rotation.

In addition, the master optical disc recording apparatus has a signal processor 12 for performing signal processing based upon signals detected by the photodetector 10 and a threading servo unit 13 for controlling the threading mechanism 11. The signal processor 12 and the threading servo unit 13 are controlled by control signals from the system controller 14.

The construction of various components of the master optical disc recording apparatus is now explained. The laser beam emitting unit 1 employs a 100 V ac source of the same capacity as the domestic power source, without providing special power sources, such as ac 200 V, required in the conventional apparatus.

Figure 2:
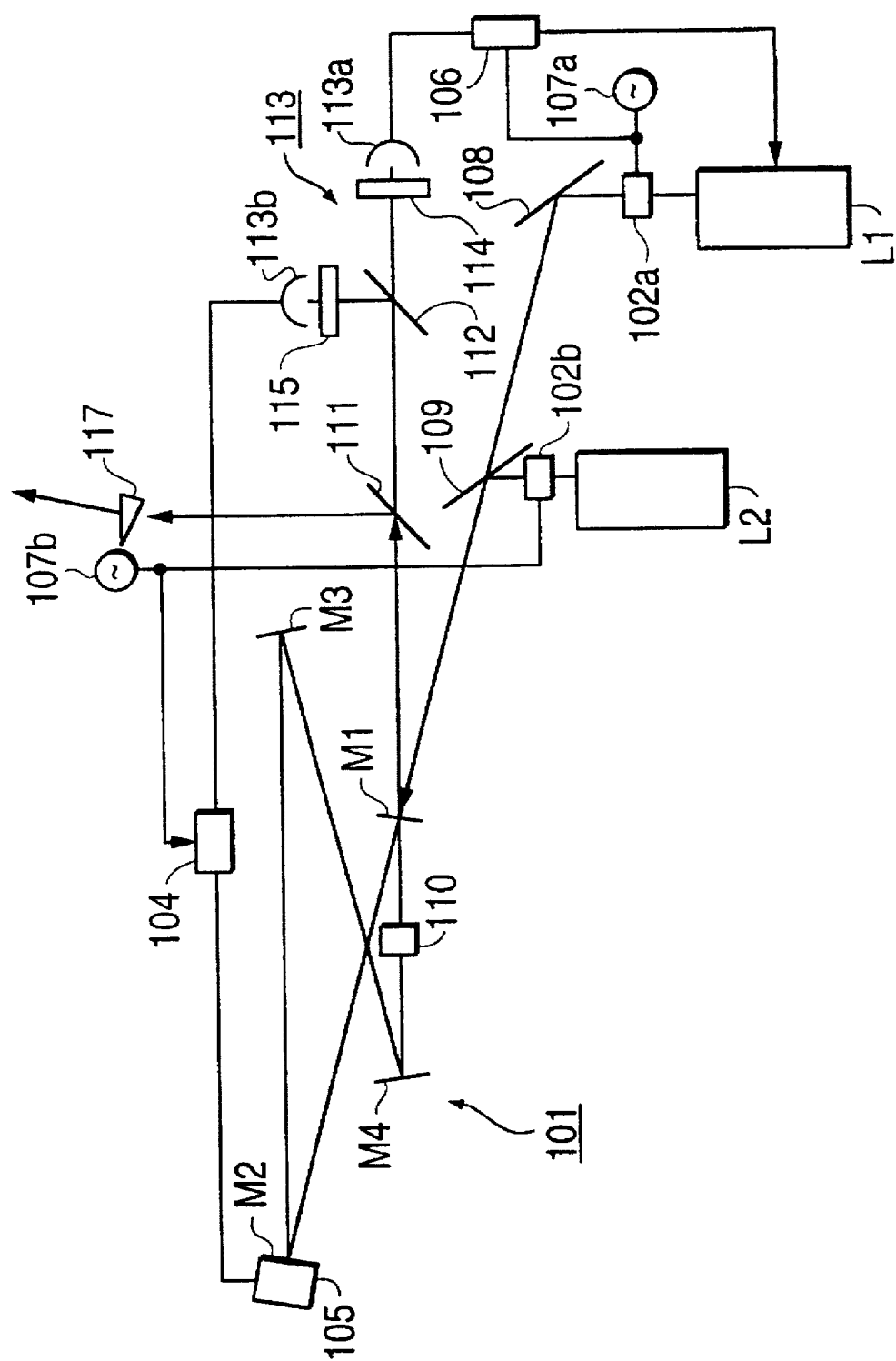
FIG. 2 schematically illustrates a laser beam emitting portion of the master optical disc recording apparatus shown in FIG. 1.

Referring to FIG. 2, the laser beam generating portion includes two laser light sources L1, L2, an external resonator 101 for capturing and resonating the laser light beams radiated by the laser light sources L1 and L2, phase modulators 102a, 102b for phase modulation of the outgoing laser light beams from the laser light sources L1 and L2 and a photodetector 113 for detecting the reflected light beam from the external oscillator 101. The laser beam generating apparatus also includes a resonator length controller 104 for controlling the length of a cavity within the external resonator 101 by an output of the photodetector 113, an electromagnetic actuator 105 for shifting a mirror along the optical axis responsive to the driving signals from the controller 104 and a wavelength controller 106 for controlling the wavelength of the laser beam incident on the external resonator 101 from the laser light source L1.

The laser light source L1, which is a light source radiating a continuous laser beam of a first wavelength, includes e.g., an Nd:YAG excited by a semiconductor laser, and generates a fundamental wave of a sole frequency with a wavelength of 1064 nm. The laser light source L1 may be frequency-controlled by external control.

The laser light source L2, a light source radiating a continuous laser beam of a second wavelength, radiates a green laser light by exciting a semiconductor laser. Specifically, by employing e.g., Nd:YVO$_4$ as a laser medium, and by generating the second harmonics with respect to the fundamental wave radiated by the laser medium within the resonator, a stable green laser light by semiconductor laser excitation, having a single frequency corresponding to one-half the wavelength of the fundamental laser beam from the laser light source L1, that is the wavelength 532 nm of the second harmonics, is produced. However, the laser light source L2 does not have the frequency controlling function.

On the optical axes of the laser beam radiated from the laser light sources L1 and L2 are arranged phase modulators 102a, 102b, respectively. As the phase modulators 102a, 102b, electro-optical (EO) elements or acousto-optical (AO) elements are employed. The phase modulator 102a is fed from a driver (driving circuit) with a modulation signal, such as with a frequency fm=10 MHz, for driving from an external oscillator 107a. Using the modulating signal, the phase modulator 102a phase-modulates the laser beam with a wavelength of 1064 nm. The phase modulator 102b similarly phase modulates the laser beam with a wavelength of 532 nm with the aid of the modulation signal from an external oscillator 107b.

By employing a technique of matching the sideband phase shift and reflected by the resonator after such phase modulation for both fundamental waves, the two fundamental waves may be positioned at the center of the mode of resonation, such that the totality of the incident light beam may be caused to be incident within the external resonator 101. The technique of frequency control within the resonator is disclosed in, for example, R. W. P. Drever et al., "Laser Phase and Frequency Stabilization Using an Optical Resonator", Applied Physics B 31.97–105 (1983).

The laser beam transmitted through the phase modulator 102a is reflected by a mirror 108 configured for reflecting the laser beam radiated from the laser light source L1 to the external resonator 101 via a beam splitter 109 as later explained. The laser beam radiated by the laser light source L2 is also transmitted via the phase modulator 102b to the beam splitter 109.

The optical properties of the beam splitter 109 are selected so that the incident laser beam with the wavelength of 532 nm and the incident laser beam with the wavelength of 1064 nm are reflected and transmitted, respectively.

The relative position of the phase modulator 102b and the beam splitter 109 is selected so that an output light beam of the laser light source L2 is superimposed on an output light of the laser light source L1, that is, so that the optical axes of the two output lights coincide with each other. The output lights of the laser light sources L1, L2 via the beam splitter 109, thus confounded with each other, are incident on a mirror M1 of the external resonator 101.

Although not shown, an optical system between the beam splitter 109 and the mirror M1 of the external resonator 101 is selected to be spatially matched on the downstream side to the intrinsic mode of the external resonator 101 made up of the mirrors M1 to M4.

The external resonator 101, made up of the four mirrors M1 to M4, is configured for generating the ultraviolet light of a wavelength of 355 nm, which is the third harmonics with respect to the fundamental wavelength of 1064 nm, by additive frequency mixing of the two incident fundamental waves.

The external resonator 101 effects wavelength conversion within the resonator using type I phase matching conditions. That is, the two fundamental wavelength laser lights are adjusted so that these two laser beams are perpendicular to the drawing sheet, that is the laser beams become S-polarized lights with respect to the mirrors. By employing the S-polarized light, the reflectance of each mirror may be higher than in the case of employing the P-polarized light, thus suppressing the loss incurred within the external resonator 101.

The mirror M1 is an input-coupling mirror to which two laser beams from the laser light sources L1, L2 are incident to the external resonator 101 simultaneously along the same optical axis. Thus the mirror M1 is an output mirror for outputting the reflected light beam of the third harmonics produced on additive frequency mixing and is actually a concave mirror having the radius of curvature equal to 80 mm.

The mirror M1 is coated with a multi-layer dielectric film for impedance matching. The multi-layer dielectric film, produced by, e.g., ion sputtering or ion plating for fabrication of a high-quality mirror, may also be formed by methods other than the ion sputtering or ion plating.

Figure 3:
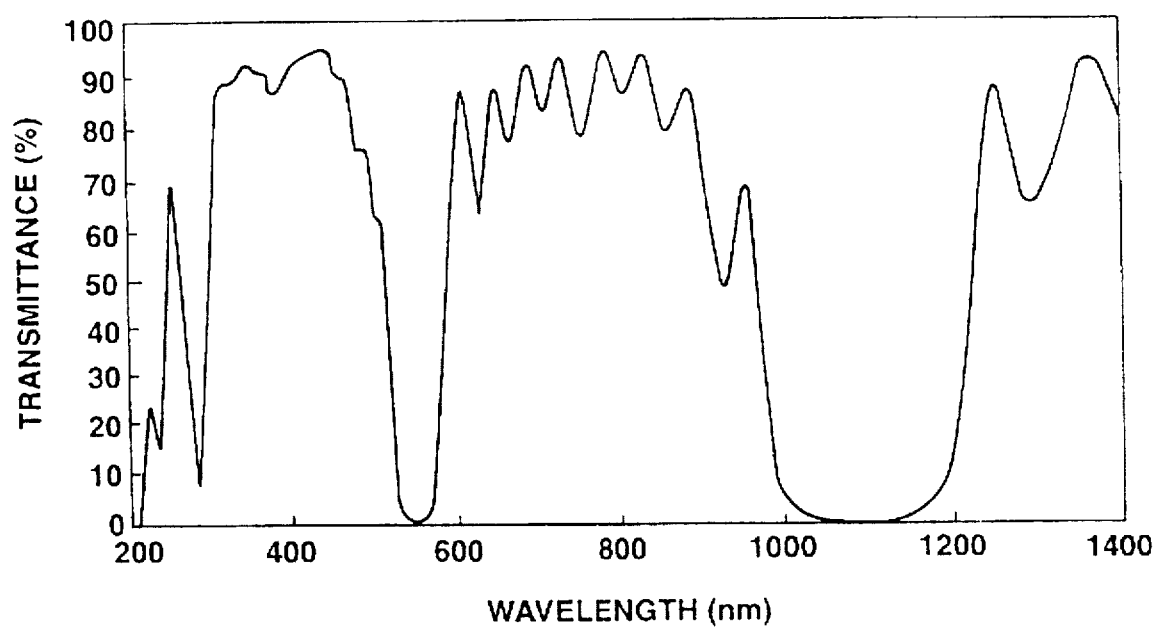
FIG. 3 is a graph showing the transmission spectrum of a mirror M1 of the laser beam emitting portion of the master optical disc recording apparatus shown in FIG. 1.

By coating the mirror M1 with a multi-layer dielectric film, the transmission spectrum as shown for example in FIG. 3 is produced. It is seen from FIG. 8 that, since the light transmittance is about 1% or higher for the wavelength of 1064 nm of the first continuous wave laser beam and for the wavelength of 582 nm of the second continuous wave laser light, the mirror M1 is highly reflective with respect to two wavelengths. On the other hand, since the mirror M1 has light transmittance as high as 90% for the wavelength of 355 nm of the third harmonics of the fundamental light, the reflected light beam of the third harmonics generated within the external resonator 101 is transmitted and outputted via the mirror M1.

The other three mirrors M2 to M4 are dual wavelength high reflectance mirrors (dual HR mirrors). These two wavelengths are 1064 nm and 532 nm. The mirrors M2 to M4 are highly reflective with respect to these two wavelengths.

The mirrors M2 and M3 are plane mirrors, while the mirror M4, similarly to the mirror M1, is a concave mirror with the radius of curvature of 30 mm.

In the external resonator 101, the distance between the mirrors M4 to M1 is on the order of 32 mm. The intrinsic mode of the external resonator 101 produces a small-sized spot between the mirrors M4 and M1. The external resonator 101 constitutes a ring-shaped oscillator in which the light path between the mirrors M4 and M1 is substantially on the same plane.

The mirror M2 is mounted on the electro-magnetic actuator 105 employed for precise positioning. The position of the mirror M2 is finely controlled by the electromagnetic actuator 105 responsive to the resonator length controlling signal supplied from outside. The electromagnetic actuator 105 has the function of controlling the resonation frequency. The manner of controlling the resonator length will be discussed subsequently.

Within the external resonator 101 is mounted a non-linear optical crystal element 110 formed e.g., of β-barium borate (BBO).

The BBO 110 is cut so that the angle with respect to the C-axis in the crystal is approximately 31.3°. The coating on the BBO 110 is selected so that the BBO becomes non-reflecting with respect to both the wavelengths of 1064 nm and 532 nm of the fundamental laser light incident on the external resonator 101.

The BBO 110 is arranged substantially partway between the mirrors M4 and M1. The plane resonator, made up of the mirrors M4 and M1, is supplied with incident light beams having two wavelengths as the S-polarized light. The BBO 110 is arranged so that the direction of light polarization by S-polarization at the spot position of the incident light is coincident with that of the natural polarization of the BBO 110. The coincidence of the directions of light polarization means that the direction of the normal light of the BBO 110 is coincident with the direction of S-polarization of the incident light.

This increases the power density of incident light on the BBO 110, even if the power within the external resonator 101 is constant, so that it becomes possible to improve the non-linear conversion efficiency of the external resonator 101.

The degree of light intensity increase by resonation depends upon the loss within the resonator, that is upon light scattering, transmission and absorption occurring in each mirror, light scattering, absorption and reflection losses on the crystal plane of the non-linear optical crystal element and upon light scattering and absorption within the crystal. That is, the lesser the loss of a resonator, the higher becomes the resonation strength. Thus, by coating the mirrors M2 and M3 with a film of low losses by, for example, ion sputtering, it becomes possible to improve the power of the generated third harmonics.

In effect, the mirrors M2 and MS are required to have reflectance not less than 99.9%. The reflectance of the mirror actually employed was on the order of 99.7 to 99.8%. If the fundamental laser light of approximately 200 mW with a wavelength of 1064 nm and the fundamental laser beam of approximately 100 mW with a wavelength of 532 nm are incident on the external resonator 101 under the above mirror conditions, third harmonics of approximately 2 mW with a wavelength of 355 nm are produced.

If the mirror M3 is a low-loss mirror, the third harmonics of approximately 10 mW with a wavelength of 358 nm are produced. Also, if the mirror M2, mounted on the electromagnetic actuator 105, is also a low-loss mirror, and the incident light is the fundamental laser light of approximately 300 mW with the wavelength of 532 nm, the third harmonics of approximately 48 mW with a wavelength of 355 nm is produced.

Thus, with the external resonator 101, the third harmonics laser light of continuous light beam may be produced by additive frequency mixing of the two incident fundamental laser beams.

The reflected light from the external resonator 101 is incident on a beam splitter 111, the optical properties of which are set for reflecting the laser beam with the wavelength of 385 nm of the incident light and for directly transmitting the laser beams of the wavelengths of 1064 nm and 532 nm.

The light beam of the third harmonics, reflected so that its optical path is bent 90° by the beam splitter 111, is occasionally subjected to elongated distortion by the walk-off effect. This distortion may be corrected by a beam shaping optical element 117, such as an anamorphic prism or a cylindrical lens, placed on the optical axis of the light beam of the third harmonics.

The light beam containing the lights of the wavelengths of 1064 nm and 532 nm, transmitted through the beam splitter 111, are incident on a beam splitter 112, the optical properties of which are set for reflecting the light with the wavelength of 532 nm and transmitting the light beam with the wavelength of 1064 nm, respectively.

The photodetector 113 of the laser beam generating apparatus has a light receiving element 113a on the optical axis of the light with the wavelength of 532 nm reflected by the beam splitter 112, and a light beam receiving element 113b on the optical axis of the light with the wavelength of 1064 nm. For providing detection signals from the light receiving elements 113a, 113b with wavelength selectivity, a filter 114 for absorbing the infrared light and a filter 115 for absorbing the green light are arranged between the light receiving element 113a and the beam splitter 112 and between the light receiving element 113b and the beam splitter 111, respectively.

With the above arrangement, the laser beam with the wavelength of 1064 nm and the laser beam with the wavelength of 532 nm are not incident on the light receiving elements 113a and 113b, respectively, so that there is no risk of deleterious crosstalk in the light receiving elements 113a or 113b.

The light receiving elements 113a, 113b detect signals containing the information on phase changes brought about by reflection in the resonator of the sideband phase modulated by the phase modulators 102a and 102b after photoelectric conversion as described above. The signals thus detected by the light receiving elements 113b, 113a are supplied to the resonator length controller 104 and to the wavelength controller 106, respectively.

The resonator length controller 104 and the wavelength controller 106 each have a mixing function, and are fed with modulation signals from external oscillators 107a, 107b, respectively. These modulation signals are wave-shaped or phase-delayed, if so desired. The resonator length controller 104 and the wavelength controller 108 perform synchronous detection by multiplication of the detection signals with the modulation signals. The resonator length controller 104 and the wavelength controller 106 find the deviation between the resonant frequency of the external resonator 101 and the light frequencies of the laser light sources L1 and L2, respectively.

The resonator length controller 104 transmits the deviation produced by transmitting the synchronously detected output signal via a low-pass filter to a driver configured for driving the electromagnetic actuator 105 as an error signal. This driver effects servo control of shifting the reflecting surface of the mirror M2 of the external resonator 101 in a direction along the optical axis by a driving signal by the electromagnetic actuator 105 along the optical axis for reducing the error signal to zero.

This allows synchronization of the output light from the laser light source L1 controlled to be suited to the resonator length of the external resonator 101 and continued resonation of the output light of the laser light source L1 within the external resonator 101.

The laser light of the laser light source L2 with a frequency fc is phase-modulated with a frequency fm by the phase modulator 102b so that a sideband fc±fm is set. The wavelength controller 106 detects the beat between the frequency fc and fc±fm of the light from the external resonator 101 with the resonant frequency fo for generating an error signal having a polarity.

In effect, the original modulation signal having a suitable phase with respect to the modulation signal component in a mixer is multiplied with the detection signal from the light receiving element 113a for synchronous detection and the modulation carrier component is eliminated by e.g., a low-pass filter for producing the error signal. The wavelength controller 106 transmits the error signal as the frequency control signal to the laser light source L2 for servo control. By this control, the output of the laser light source L2 is synchronized with the frequency of the external resonator 101.

In this manner, the two laser light sources L1, L2 are synchronized simultaneously. Thus the two fundamental continuous laser lights are circulated in the external resonator 101 simultaneously. Within the external resonator, these two fundamental continuous laser lights, which may be strengthened in intensity by resonation, are incident on the BBO 110 to produce continuous laser light of third harmonics by additive frequency mixing for raising the conversion efficiency.

Figure 4:
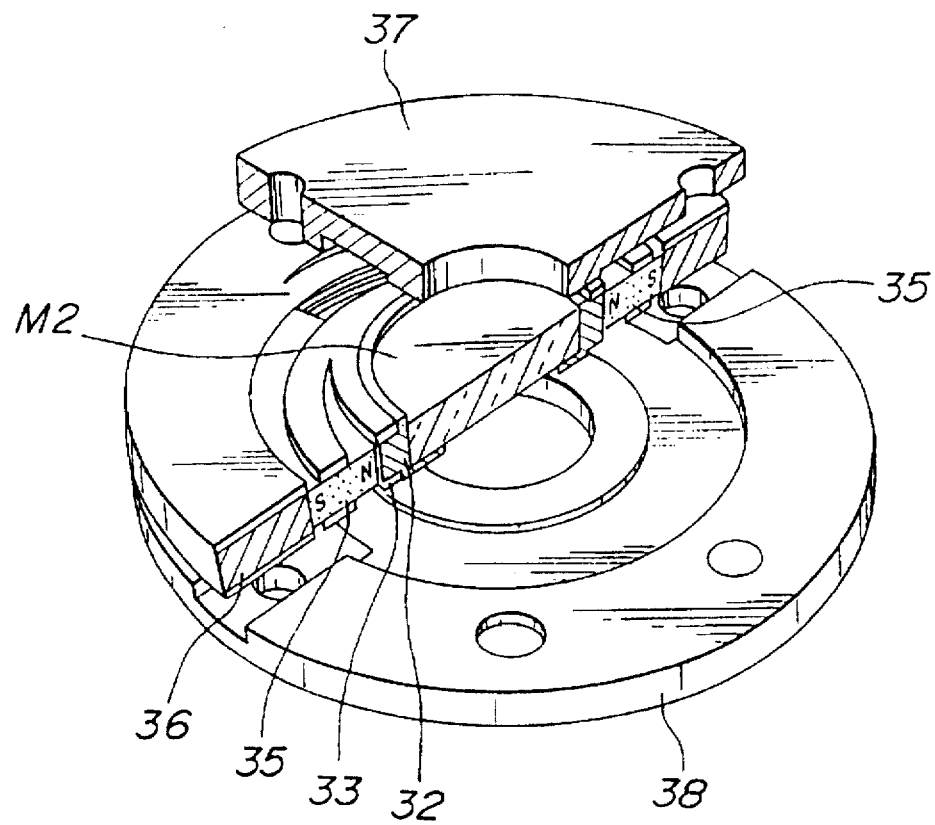
FIG. 4 is a partial perspective view showing an illustrative construction of an electro-magnetic actuator of the laser beam emitting portion.
Figure 5:
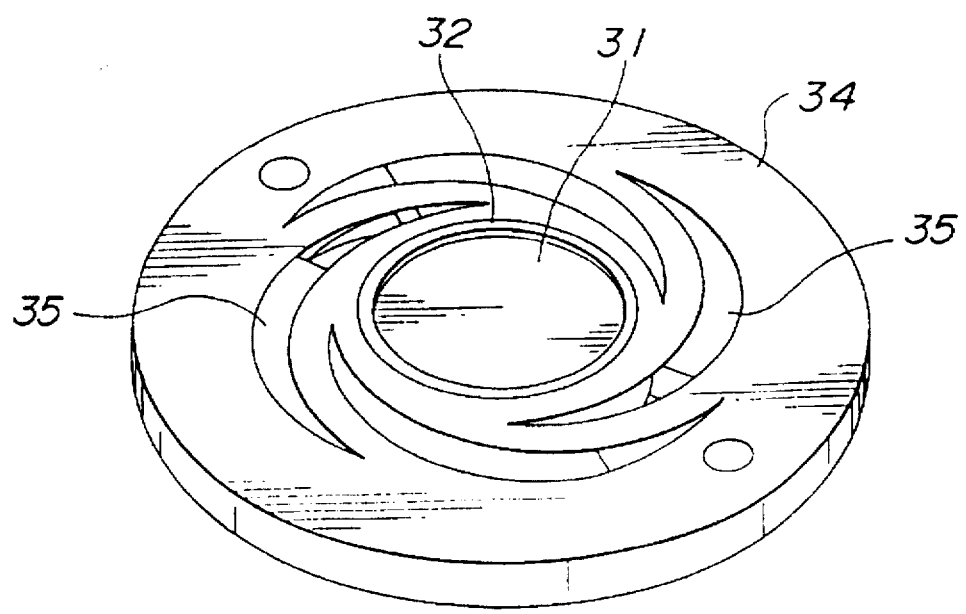
FIG. 5 is a schematic perspective view showing a spiral spring plate of the electro-magnetic actuator of the laser beam emitting portion.
Figure 6:
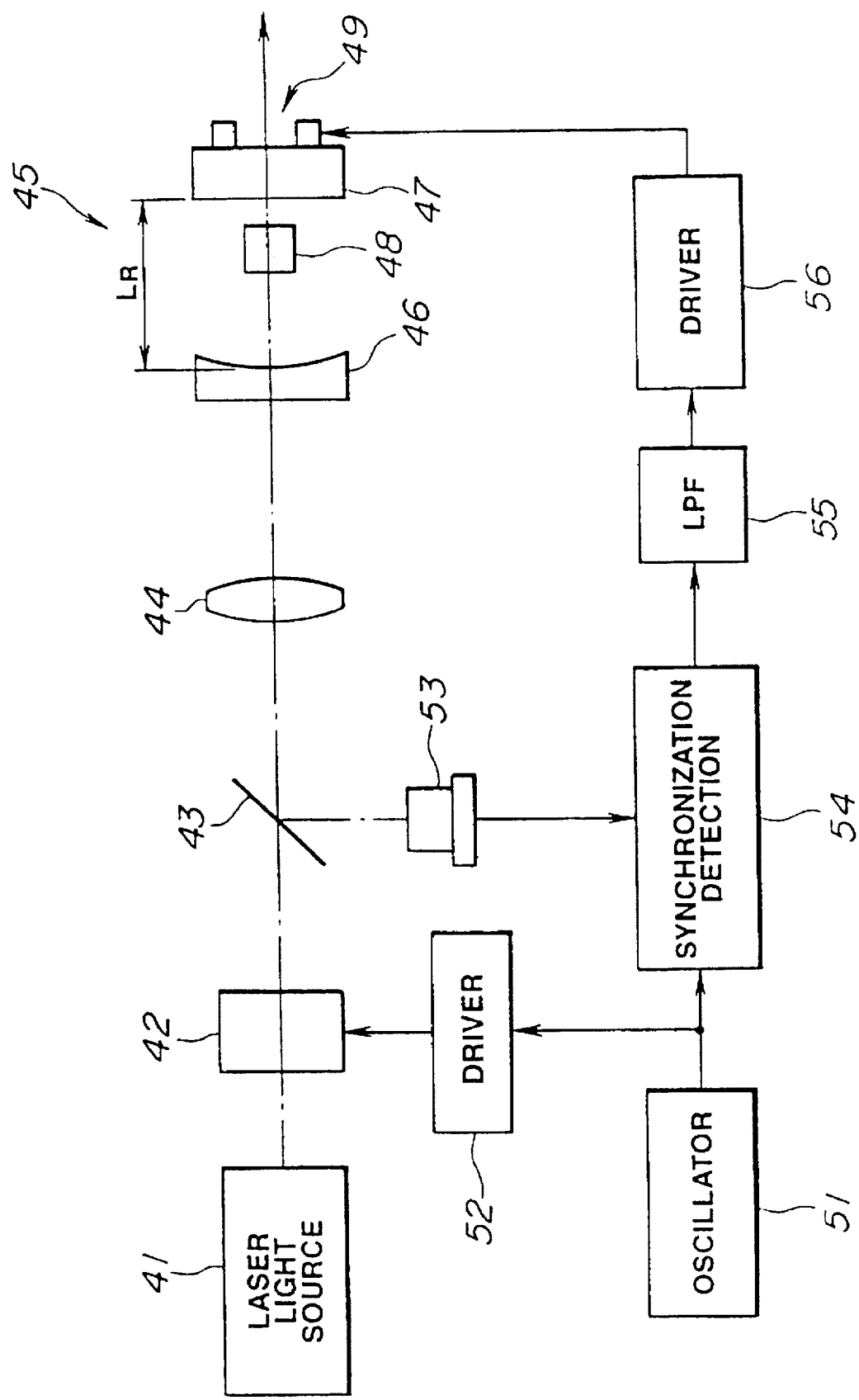
FIG. 6 schematically illustrates an injection synchronization laser employed in the laser beam generating portion.

Reference is had to FIG. 4 showing an illustrative construction of the electromagnetic actuator 5 and to FIG. 5 showing a spiral spring plate 34.

The mirror M2 is securely fitted to a coil bobbin 32 formed as a ring-shaped or cylindrical ceramic insulator. Around the coil bobbin 32 is fitted a coil 33 (i.e., a so-called "voice coil") in the form of a solenoid. This coil bobbin 32 is fitted on a spirally-shaped spring plate 34 shown for example in FIG. 5. This spring plate 34 is securely supported by a magnet 35 on a ring-shaped yoke 38. The magnet 35 is arranged for surrounding the cylindrical coil 83 of the coil bobbin 32. The magnet 35 has its inner and outer peripheral sides magnetized to N and S poles, respectively. The magnet 38 has its outer peripheral side secured, such as by adhesion, to the yoke 36 of a magnetic material, such as iron. The spring plate 34 is secured, such as by adhesion, to the upper and lower sides of the coil bobbin while having its outer periphery supported by the yoke 36. These components are sandwiched in their entirety between shielding plates 37, 38 of a magnetic material, such as iron. These shielding plates 37, 38 as well as the yoke 36 perform the function of a return magnetic path for the magnetic flux from the magnet 35. The components are surrounded by these shield plates for facilitating their handling.

It is possible with the above-described electro-magnetic actuator 5 to achieve a larger driving force along the optical axis and transmission characteristics with little phase deviation because the magnetic circuit is formed substantially as a closed magnetic path despite the fact that no electrically conductive component nor magnetic components are arranged on the inner side of the coil 33. By using ceramics as the material for the coil bobbin 32, the dual resonant frequency not lower than 100 kHz may be achieved.

By constructing the laser beam generating apparatus in this manner, a continuous laser beam may be produced which may be employed in a wider range of application than that achievable with pulsed third harmonics produced from the fundamental laser light.

Since the main point of the present invention resides in dual resonation of the fundamental laser beams from the laser light sources L1, L2 by the external resonator 101, the external resonator need not necessarily be synchronized with one of the fundamental laser beams provided both of the two fundamental laser lights have the frequency control function. It is only sufficient if the frequency of each of the two fundamental laser beams is synchronized with the resonant frequency of the external resonator 101.

When producing continuous light beam by additive frequency mixing in the external resonator 101, the UV light may be produced by resonation of the light beam from at least one light source, that is by single resonation. Although the control system for resonation may be advantageously reduced in scale to one half thus simplifying the system configuration, the nonlinear conversion efficiency of the laser beam is lowered.

The generating apparatus for a master laser light, employed as a frequency-controllable laser light source in the present invention, may be an injection synchronous laser light generating apparatus for radiating the injection-synchronized laser light or a laser light generating apparatus having an external resonator within the laser light source.

The injection synchronous laser beam generating apparatus radiates a continuous fundamental laser beam associated with e.g., the laser light source L1, while the laser light generating apparatus having the external resonator radiates the continuous laser light of second harmonics by the external resonator in association with the laser light source L2. As the laser light sources L1 and L2, one or both of the injection synchronous laser light generating apparatus and the laser light generating apparatus having the external resonator may also be employed.

The injection synchronous laser beam generating apparatus amplifies an input signal, having a frequency close to the self-running frequency of the laser oscillating apparatus, to a laser light of larger amplitude and the same frequency as the input signal, by exploiting the phenomenon in which the oscillation frequency of the laser light generating apparatus is captured to the input signal frequency.

Referring to a schematic arrangement shown in FIG. 8, an illustrative construction of the injection synchronous laser light generating apparatus employed as the laser light source L2 is explained.

The laser light source L2 has a laser light source 41 for radiating the fundamental laser light configured for generating second harmonics. The fundamental laser beam from the laser light source 41 is phase-modulated by a phase modulator 42 and is incident on an external resonator 45 via a reflecting surface 43 for detecting the reflected light beam of the resonator and a light condensing lens 44.

The external resonator 45 has a non-linear optical crystal element 48 between the reflecting surface of the concave mirror 46 and the reflecting surface of the plane mirror 47. Resonance occurs when the length of an optical path $L_R$ between the reflecting surfaces of a pair of concave mirrors 46 and the reflecting surface of the plane mirror 47 is of a preset length such that the optical path phase difference A becomes equal to an integer number times $2\pi$, with the reflectance and the phase of reflection being significantly changed in the vicinity of the resonance phase. One of the reflecting surfaces 46 and 47 of the resonator 45, such as the reflecting surface 47, is driven in the direction of the optical axis by an electro-magnetic actuator 49.

An oscillator 51 outputs a modulation signal for driving the phase modulator 42. These modulation signals are transmitted to a driver 52. The reflected light beam of the laser light sent to the resonator 45 is detected via the reflecting surface 43 by a photodetector 53 so as to be sent as a reflected light beam detection signal to a synchronous detection circuit 54.

The synchronous detection circuit 54 is fed with modulated signals from an oscillator 51 and multiplied by the reflected light detection signal in order to perform synchronous detection. The detection signal of the synchronous detection circuit 54 becomes an error signal for the optical path length of the oscillator via an LPF 55. This error signal becomes a driving signal for the electro-magnetic actuator 49. The electro-magnetic actuator 49 is responsive to this driving signal to shift the reflecting surface 17 along the optical axis for reducing the error signal to zero by way of performing servo control of controlling the resonator length.

If, with the above construction, the frequency of the input signal to the injection synchronous laser light generating device is controlled to be set to the resonance frequency of the external resonator 101, the phase modulation provided only to a master laser incident on the external resonator 101 may be directly employed as a signal source for synchronization with the external resonator 101 configured for performing additive frequency mixing. That is, the phase modulation provided to the master laser for injection synchronization may be used in place of the phase modulator 102a configured for phase modulating the output light of the laser light source L1 for synchronizing the phase modulation with respect to the external resonator 101 without employing the phase modulator 101b or the oscillator 107b.

The fundamental laser light may also be radiated to the external resonator 101 by employing an arrangement comprising synchronizing SHG with another external resonator for effecting phase modulation as in the case of the laser light generating apparatus having the external resonator without employing the phase modulator 102b or the oscillator 107b.

By employing the injection synchronous laser light generating device and the laser light generating apparatus fitted with the external resonator as one or both of the laser light sources L1 and L2 as the master laser, it becomes possible to raise the output of the third harmonics of continuous laser light from the external resonator 101 and hence to provide a high output of the reflected light from the external resonator 101.

The relation between the phase matching condition and the non-linear optical crystal is briefly explained.

With the non-linear optical crystal element, arranged within the external resonator 101, THG is carried out based upon type I phase matching conditions by employing a BBO 110 cut at an angle of about 31.3°. The phase matching condition is not limited to type I, such that the phase matching conditions of type II may also be employed for generating the additive frequency light of the continuous fundamental light beam of 1064 mm and the continuous fundamental light beam of 532 mm by setting the cutting angle of the crystal of the BBO 110 to about 38.6° or to about 59.7°.

By setting the cutting angle of the non-linear optical crystal element in this manner, the phase matching conditions for THG may be selected for raising the degree of freedom in THG.

The non-linear optical crystal element is not limited to BBO and periodically poled lithium niobate (PPLN) may also be employed. The poling period actually required is an odd number multiple of about 1.9 μm or about 3.6 μm in case of interaction employing the non-linear optical coefficient $d_{33}$ or $d_{31}$, respectively.

If the PPLN is arranged within the external resonator 101, pseudo phase matching may be achieved. The non-linear conversion efficiency may be improved because of the high non-linear optical coefficient as the material constant. The conditions of the film-forming process may be alleviated by raising the non-linear conversion within the external resonator 101 for lowering the optimum reflectance of the mirror M1 as the input coupling mirror.

With the use of the PPLN, an output light having substantially the circular beam pattern is produced since there is no walk-off in the reflected light beam from the external resonator 101. This enables size reduction of the laser generating apparatus since no beam-shaping optical components need to be provided in the laser light generating apparatus and hence the number of the component parts may be diminished.

As a laser medium for generating the laser light having the wavelength of 1064 mm, LNP, YLF, GGG or YAP may also be employed in addition to Nd:YAG or Nd:YVO$_4$.

Figure 7:
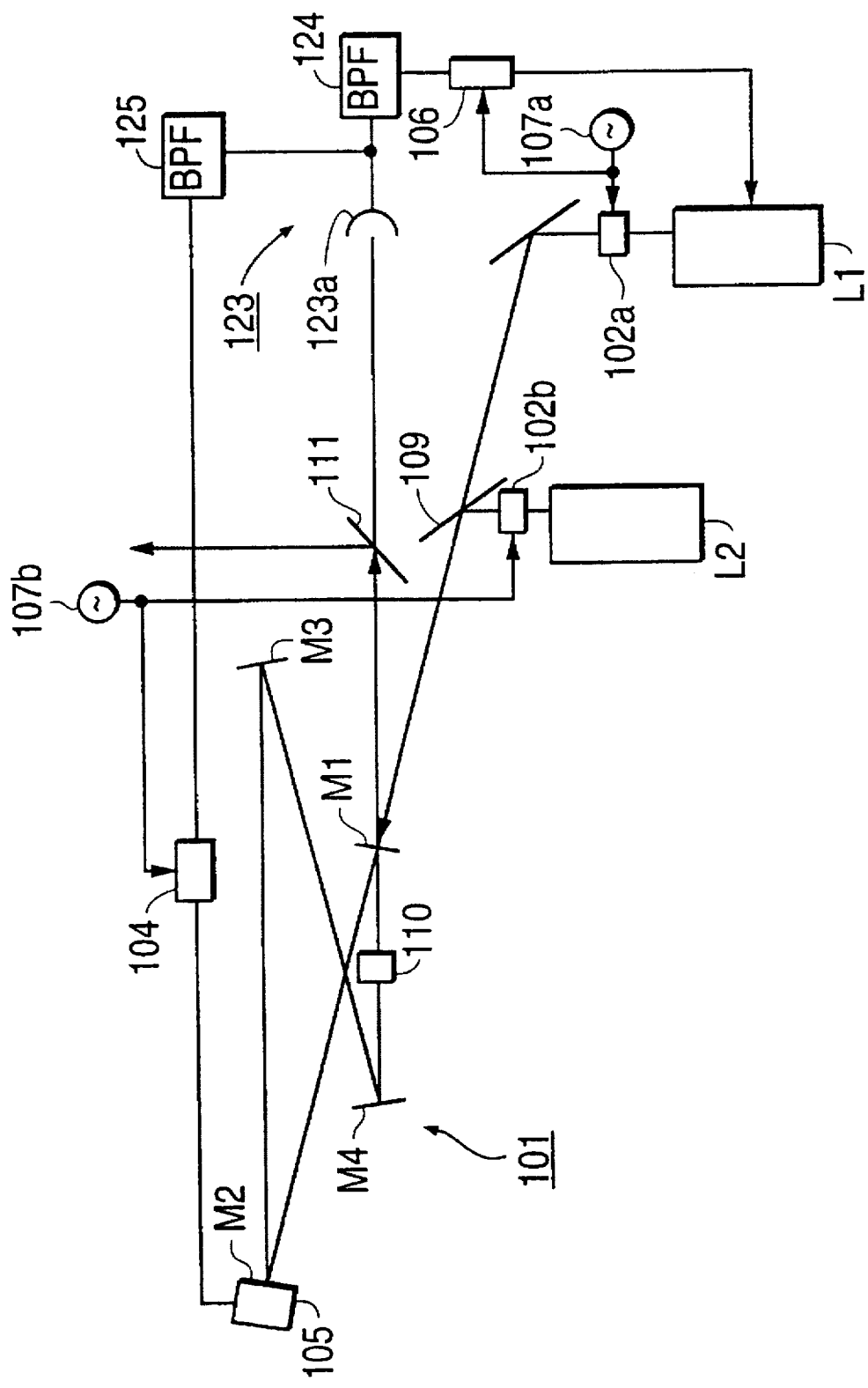
FIG. 7 schematically illustrates a modified laser light emitting portion.

Referring to FIG. 7, a modification of the laser light generating apparatus is explained. The same components as those used in the previous embodiment are denoted by the same numeral and the corresponding description is not made for clarity.

The laser light generating apparatus includes a light receiving element 123a for receiving the light reflected from the external resonator 101 and transmitted through the beam splitter 111, and band-pass filters (BPFs) 124, 125 for electrical carrier frequency discrimination of detection signals obtained on photoelectric conversion by the light receiving element 123a, as shown for example in FIG. 7.

The laser light generating apparatus performs resonation control such that the output lights of the laser light sources L1 and L2 are phase modulated by the phase modulators 102a, 102b with different frequencies so that the output light beams undergo simultaneous resonation on the same optical axis within the external resonator 101. Thus, a portion of the reflected light of the external resonator 101 is transmitted via the beam splitter 111 to the light receiving element 123a. The light sent to the light receiving element 123a contains the lights with the wavelengths of 1064 mm and 532 mm. The light receiving element 123a performs photoelectric conversion on the received light containing the lights of these wavelengths and sends corresponding detection signals to the BPFs 124 and 125, respectively.

The BPF 124 performs frequency selection so that the frequency band passed through the BPF 124 is not an integer number multiple of the frequency band passed by the BPF 125. By selecting the frequency in this manner, signals of harmonic distortion of the BPFs 124 and 125 may be prohibited from being overlapped, thus enabling detection of signals of various wavelengths. This makes it possible to avoid cross-talk of detection signals otherwise produced in the two wavelengths.

The signals passed through the BPF 125 are transmitted to the resonator length controller 104, while the signals passed through the BPF 124 is supplied to the wavelength controller 106. The resonator length controller 104 and the wavelength controller 106 respectively output the resonator length control signal and the frequency control signal to the electromagnetic actuator 105 and to the laser light source L1.

Although the above-described laser light generating portion 1 employs a Nd-based solid laser in which the continuous laser medium is Nd:YAG or Nd:SFAP, the preset invention is not limited to this specific configuration. For example, the light with the wavelength on the order of 880 nm may be used as a fundamental wave, using an InAlGaP system as the continuous light medium, so that the laser beam with the wavelength on the order of 340 nm will be outputted by SHG process within the external resonator 101.

The laser light generating portion 1 may also be configured so that the light of the Nd-based solid laser with an output wavelength of 1320 nm is used as a fundamental light beam and the laser beam having the wavelength of approximately 330 nm is generated by fourth harmonics generation of the fundamental light.

It is also possible to divide the generation process for the laser light by the fourth harmonics generation into two second harmonics generating processes to generate second harmonics with respect to the basic wavelength. In such case, second harmonics of a continuous wave are generated by a non-linear optical crystal element arranged in at least one of the second harmonics generating processes, using the second harmonics generated in the second harmonics generating process as a fundamental wave.

If the laser light generating portion 1 is arranged in this manner, the beam shaping optical device 117, configured for shaping the output light of SHG into an output light of a symmetrical pattern, is arranged outside of the external resonator 101.

Referring again to FIG. 1, the construction of the master optical disc recording apparatus is explained.

The light from the laser light generating portion 1 is incident on the collimator lens 2 configured for collimating the incident light. The collimator lens 2 may be constructed integrally with the beam shaping optical element 117. This compensates for non-symmetry of the laser beam due to the walk-off effect of the non-linear optical crystal element. The beam shaping optical element 117 may be enumerated by an anamorphic prism.

The recording information is supplied from outside to the light modulator 3 constructed as, for example, an acousto-optical (AO) element. The light modulator 3 modulates the laser light with the recording information.

This laser beam is sent to a half mirror 4a which bends the optical axis by 90° towards the master optical disc 7 and causes the laser light to fall on the recording lens 4 operating as an objective lens. This recording lens 4 is fitted with a bi-axial actuator 5, as a part of the automatic focusing mechanism, for shifting the recording lens 4 for converging the laser beam on the master optical disc 7. The automatic focusing mechanism will be explained subsequently. The laser beam, which has passed through the thus focused recording lens 4, is radiated on the master optical disc 7.

The master optical disc 7 is formed by a glass substrate coated with a photoresist. The laser beam contains not only the laser light of the ultraviolet wavelength but also the stray light of the visible range radiated from the laser light generating portion 1 on the same optical axis as that of the UV laser light. This stray light beam is the light of second harmonics with respect to light of the Nd-based solid laser, that is the green light with the wavelength of approximately 532 nm.

For alignment required for a master optical disc recording apparatus, a different sort of the laser, or a camera having sensitivity in the UV range, with an annexed display device, has to be employed as an accessory device since only the UV light is outputted with the use of a conventional gas laser.

If the visible light beam travelling on the same axis as that of the exposing light is used for alignment of the master optical disc, it is unnecessary to provide a separate laser light for alignment within the recording apparatus. It is noted that a photoresist needs to be formed of a photosensitive material sensitive only to the UV light since the photoresist sensitive to the visible light leads to deteriorated resolution.

It is known that certain photoresists are sufficiently sensitive only to the UV range with the wavelength of 350 nm, while being not sensitive to the green light of the visible range. If such photoresists are used, the visible light does not affect recording on the master disc. This significantly simplifies the construction required for optical alignment of the overall apparatus, while reducing the cost and time required for maintenance since the light for alignment travels on the same optical axis as the exposing light.

In addition, with the master optical disc recording apparatus, the exposing light is reflected by the master optical disc 7. The reflected light is transmitted through the recording lens 4 and the half mirror 4a so as to be incident on the filter 9 configured for transmitting only the visible light. Thus the photodetector 10 receives only the visible light transmitted through the visible range.

Although both the half mirror 4a and the filter 9 are used for receiving the light for alignment, the present invention is not limited to this illustrative construction. For example, a dichroic mirror may be employed which reflects the incident light beam from the light modulator 3 and absorbs the UV light while having high transmission characteristics for the incident light beam from the recording lens 4.

The photodetector 10 converts the detected light into electrical signals which are supplied to the signal processor 12.

The signal processor 12 has a flaw detection circuit for detecting flaws in the master optical disc and a focusing servo circuit forming a part of the automatic focusing mechanism. The focusing servo circuit outputs focusing error signals. The signal processor 12 generates driving control signals for driving the bi-axial actuator 5 along with the focusing servo signals.

The signal processor 12 sends the driving control signal to the bi-axial actuator 5 for automatic focusing.

The signal processor 12 also has a rotation servo circuit for controlling the rpm of the spindle motor 8. The signal processor 13 performs various control operations as it exchanges signals with the system controller 14.

The maser optical disc recording apparatus has a threading mechanism for radially feeding the turntable 8 in a direction along the disc radius while the master optical disc 7 is kept in rotation. The threading mechanism 11 has a feed table 11a configured for not affecting the rotary shaft of the disc 7, a threading motor 11b for feeding the feed table 11a, and a feed table position detection portion 11c for detecting the position of the feed table 11a.

The feed table position detection unit 11c sends a detection signal to the threading servo circuit 13 which manages control so that the recording information will be exposed to light on concentric circles with a correct pitch. The threading servo circuit 13 also controls the movement of the master disc as it exchanges signals with the system controller 14.

By this arrangement, the wavelength of the laser light employed for recording on the master disc may be reduced for improving the information recording density.

In this manner, there is provided a master optical disc recording apparatus employing a light source which is relatively maintenance-free and superior in durability and efficiency. By such excellent efficiency, the conventionally employed source, such as a 200 V power source, may be replaced by an ac 100V source for improving the power source efficiency of the overall apparatus.

The light source may also be air-cooled for enhancing the usefulness of the apparatus as compared to known apparatus operating in the same wavelength range.

By exploiting the visible stray light, the laser for focusing detection may be eliminated for facilitating the optical axis adjustment of the overall apparatus.

In addition, it becomes possible to reduce costs and maintenance time as well as to increase the information recording density. Furthermore, since dangerous gases may be eliminated, safety during maintenance may be improved.

What is claimed is:

1. An apparatus for exposing a master optical disc comprising:

laser light generating means for generating a light beam having a wavelength of 300 to 360 nm by wavelength conversion from a light beam from a laser light source by a resonator having a non-linear optical crystal element therein;

light modulation means for modulating an outgoing light of said laser light generating means in accordance with the recording information from outside; and scanning means for scanning the master optical disc with the light beam from said light modulation means for recording said recording information thereon, wherein said laser light generating means includes a first light source for generating a continuous laser light of a first wavelength, a second laser light source for generating a second continuous laser light of a second wavelength shorter than the first wavelength, and a resonator having a non-linear optical crystal element therein, said resonator causing the laser lights from said first and second laser light sources to be oscillated in resonance for additive frequency mixing for generating a continuous laser light of a third wavelength.

2. The apparatus as claimed in claim 1 further comprising a detector for detecting the laser light of said second wavelength radiated by said laser light generating means and reflected by said master optical disc, and adjustment means for positioning the master optical disc based upon a signal outputted by said detector.

3. The apparatus as claimed in claim 1 wherein said second light source radiates second harmonics with a wavelength $\lambda/2$, where $\lambda$ is the wavelength of said first light source.

4. The apparatus as claimed in claim 1 wherein wavelengths of the laser lights radiated from said first light source and said second laser light source are 1064 nm and 532 nm, respectively.

5. The apparatus as claimed in claim 1 further comprising beam shaping means for beam shaping an outgoing light from said resonator.

6. The apparatus as claimed in claim 1 wherein said laser light generating means generates a light beam with a wavelength on the order of 340 nm from said resonator from a light beam with a wavelength on the order of 880 nm as a basic wavelength using an InAlGaP based laser light source.

7. The apparatus as claimed in claim 1 wherein said laser light generating means generates a light beam with a wavelength on the order of 330 nm by fourth harmonics generation from a basic laser light with a wavelength on the order of 1320 nm using an Nd-based solid laser medium as a light source.

8. The apparatus as claimed in claim 1 wherein said laser light generating means further generates a stray light in the visible range.

9. The apparatus as claimed in claim 8 wherein the light from said laser light generating means is used as an illuminating light for said master optical disc and wherein the stray light in the visible range radiated on the same optical axis as that of said illuminating light from said resonator is used for optical axis adjustment of said optical lens system and for detecting the focusing with respect to the master optical disc.

10. The apparatus as claimed in claim 8 further including photosensitive material sensitized with a wavelength different from the wavelength of the stray light.

* * * * *